United States Patent Office 3,453,971
Patented July 8, 1969

3,453,971
RESILIENT RAILWAY WHEEL AND AXLE DRIVE
Masahiko Ishizawa, Tokyo-to, Japan, assignor to Nippon Kokuyu Tetsudo, Tokyo-to, Japan
Filed Feb. 18, 1966, Ser. No. 528,576
Claims priority, application Japan, May 20, 1965, 40/29,318
Int. Cl. B61c 9/06; B60b 19/00, 23/00
U.S. Cl. 105—131                                6 Claims

ABSTRACT OF THE DISCLOSURE

A power transmission arrangement in which two driven load-supporting wheels are connected by an axle disposed within and coaxial with a hollow shaft rotationally driven by a motor and having driving arms at opposite ends thereof for driving the wheels. Each arm has a torque-transmitting bushing for transmitting torques to the respective wheels. Each bushing has a higher and a lower torque transmissibility in dependence upon their angular orientation in the direction of rotation of the wheels. The bushings of the arms at opposite ends have their higher and lower torque transmissibility in mutually perpendicular directions so that greater torque is transmitted to one wheel then the other from the common drive motor.

---

This invention relates generally to motive power transmission systems for vehicles and more particularly to a new device for transmitting motive power from an electric motor, through a hollow shaft, to wheels.

In general, an electric motor for vehicles is supported by a so-called semi-nose-suspension or nose suspension method. That is, half of the weight of the motor is supported, through its nose part, by the bogie truck or chassis structure, and the remaining half of the weight is supported, through a hollow shaft, by wheels.

In an arrangement of this nose suspension type, the motive power of the motor is transmitted from a pinion fixed to the motor shaft to a hollow shaft by way of a gear fixed near one end of the hollow shaft. At this one end of the hollow shaft, there is provided integrally therewith a driving arm or spoke member which is coupled by rubber bushings to the wheel on one side. The other end of the hollow shaft is also coupled by way of a similar driving arm member and rubber bushings to the wheel on the opposite side.

However, since the driving motor is supported through a pair of left and right bearings by the hollow shaft, it is not feasible to construct the driving arm member on said other end integrally with the hollow shaft for reasons of convenience in assembling, disassembling, and replacing the bearings, and it is necessary to fabricate the two parts separately and fit them together. This necessity, however, gives rise to a problem in that, since the space in this part is generally small, since it is restricted by the main motor, it is difficult to obtain a good tight fit, and, therefore, a large torque cannot be transmitted. For this reason, in a power transmission device in which a hollow shaft of heretofore known construction is used, there are cases of loosening of the fit between the driving arms and the hollow shaft in instances such as that of repeated wheel slippage.

According to the present invention the coupling between the hollow shaft and the driving arms is simplified by a construction and arrangement of parts whereby the motive power to be transmitted from the hollow shaft to the left and right wheels is not distributed equally to the wheels, but, through the driving arms provided integrally with the hollow shaft, a torque greater than that transmitted through the driving arms fitted to the hollow shaft is transmitted to the corresponding driving wheel, whereby the above described difficulty is overcome.

More specifically, it is an object of the present invention to provide a motive power transmission device for railway vehicles adapted to transmit torques of different magnitudes from the hollow shaft respectively to the left and right wheels.

Another object of the invention is to provide rubber bushings which are provided between driving arms and a wheel, and by which the torque to be transmitted therebetween can be varied in a simple manner.

Still another object of the invention is to simplify the coupling mechanism between the hollow shaft and the driving arms in a power transmission device for transmitting motive power from a semi-nose suspension type motor through the hollow shaft to the wheels.

According to the present invention, in order to achieve the above set forth objects, use is made of rubber bushings each having a rigidity the magnitude of which differs in two diametrical, mutually-perpendicular directions. The bushings are provided between the driving arms integral with the hollow shaft and the wheel thereby driven and are installed with their respective directions of higher rigidity in the wheel rotational direction, while the bushings provided between the driving arms on the opposite side, that is, the driving arms constructed separately from the hollow shaft and later fitted thereto, and the wheel thereby driven are installed with their respective directions of lower rigidity in the wheel rotational direction.

By this construction and arrangement, the torque transmitted through the driving arms of the opposite side which are not integrally constructed with the hollow shaft becomes relatively lower. Accordingly, the coupling between these driving arms and the hollow shaft can be simplified and a simple bolted joint may be used in some cases instead of a force fit joint. Furthermore, the assembly and disassembly of the driving arms and other parts are facilitated, and convenience in replacement and checking of bearings is afforded.

The rubber bushings having different magnitudes of rigidity in two mutually-perpendicular, diametrical directions as mentioned above may be of various configurations. As one example, a convenient construction is that of a rubber ring interposed between and bonded to two concentric steel rings. Holes are provided in the rubber ring on diametrically opposite sides thereof. In this construction, the rigidity of the rubber bushing is low in the direction of the holes and is high in a direction perpendicular thereto.

The nature, principle, and details of the invention will be more clearly apparent from the following detailed description with respect to a preferred embodiment of the invention when read in conjunction with the accompanying drawings in which like parts are designated by like reference numerals, and in which.

Figure 1:
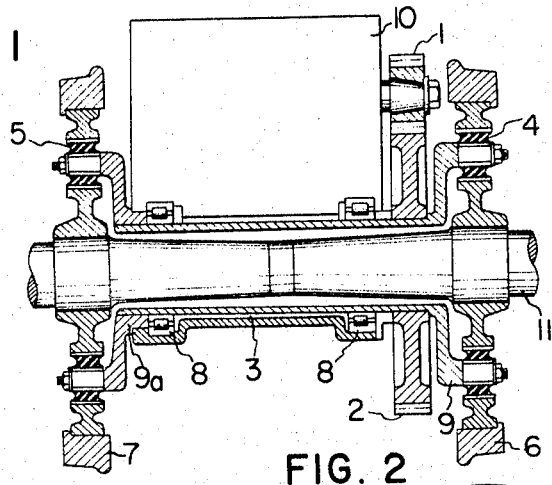
FIG. 1 is an elevation view in vertical section showing a power transmission device embodying the invention for a main electric motor of the nose suspension type.

Referring to FIG. 1, a main motor 10 is mounted in the nose suspension manner with its "nose" (not shown) suspended from the bogie truck structure (also not shown), one half of its weight thereby being supported by the truck structure. The remaining one half of the motor weight is supported by a pair of bearings 8, 8 provided about a hollow shaft 3 in positions spaced apart in the axial direction. The hollow shaft 3 concentrically encompasses an axle 11.

In the ordinary manner, a pinion 1 driven by the motor 10 is meshed with a gear 2 fixed to the hollow shaft 3 thereby to transmit motive power from the motor 10 to the hollow shaft 3. The power so transmitted to the hollow shaft 3 is further transmitted, through driving arms 9 and 9a provided a the ends of the hollow shaft and rubber bushings 4 and 5, to right and left wheels 6 and 7.

The driving arms on one side, that is, driving arms 9 on the right-hand side (as viewed in FIG. 1) or the side of the pinion 1 in this case, can be contructed integrally with the hollow shaft 3, but the driving arms 9a on the opposite side or left-hand side cannot be constructed integrally with the hollow shaft because of the necessity for facilitating assembly, disassambly, and relacement of the bearings 8, 8. For this reason the driving arms 9a are ordinarily fitted in a detachable manner onto the hollow shaft as shown in FIG. 1.

However, the space around the parts so fitted is restricted by the main motor 10, and it is not possible to construct a strong fitted joint between the driving arms and the hollow shaft. Consequently, there is the disadvantageous tendency of the fit between the driving arms 9a and the hollow shaft 3 becoming loose under severe running conditions such as repeated slippage of the wheels.

According to the present invention, the torque transmitted from the hollow shaft 3 to the wheels is transmitted principally through the driving arms 9 integrally constructed with the hollow shaft 3 and driving the wheel 6 on one (right-hand) side. The torque transmitted to the wheel 7 on the other (left-hand) side through the driving arms 9a separately constructed with respect to the hollow shaft 3 is relatively reduced. Moreover, the motor weight is equally imposed on the two wheels 6 and 7 through the rubber bushings 4 and 5.

For effecting the above described transmission according to the present invention, rubber bushings which are so constructed that each has different rigidities in two diametrical directions perpendicular to each other are used for the bushings 4 and 5. Each of the bushings 4 between the driving arms 9 integrally constructed with the hollow shaft 3 and the wheel 6 driven thereby is installed with its direction of greater rigidity tangential to the rotational direction of the wheel 6, while each of the bushings 5 between the driving arms 9a constructed separately from the hollow shaft and later fitted thereon and the wheel 7 driven thereby is installed with its direction of lower rigidity tangential to the rotational direction.

Figure 4:
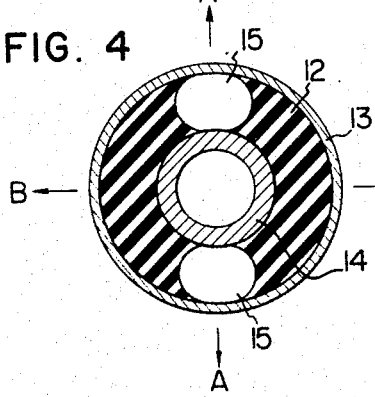
FIG. 4 is a sectional view taken in a direction parallel to the axle showing one example of a rubber bushing suitable for use in the power transmission device shown in FIG. 1.

In order to provide rubber bushings which, with the same construction, can be used in states of high and low rigidities depending on their installation orientations, each of the rubber bushings according to the invention is constructed as shown in FIG. 4. As shown, a rubber ring 12 is interposed between concentric inner and outer rings 13 and 14 made of metal such as steel and is securely bonded to both rings 13 and 14. Holes 15 are formed on one diametrical direction A—A in the rubber ring 12, the rigidity of which in the A—A direction is thereby rendered relatively low, and the rigidity thereof in the diametrical direction B—B perpendicular to direction A—A is rendered relatively high.

Figure 3:
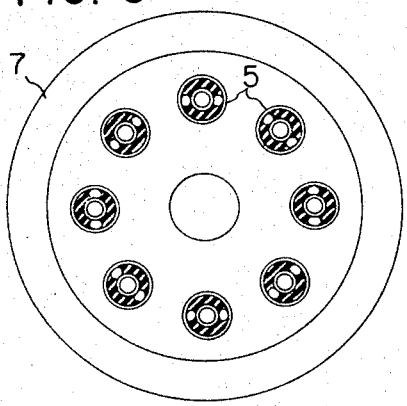
FIG. 3 is an end view of the left-hand end of the device as shown in FIG. 1.
Figure 2:
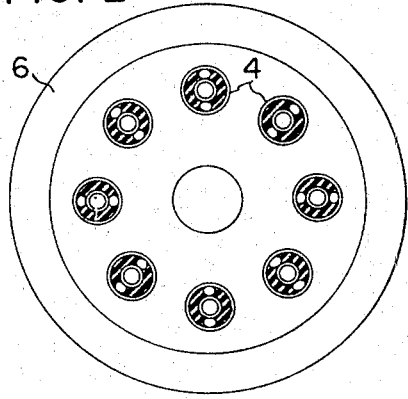
FIG. 2 is an end view of the right-hand end of the device as shown in FIG. 1.

Then, for the bushings 4 between the driving arms 9 integrally constructed with the hollow shaft 3 and the wheel 6, rubber bushings each of the construction shown in FIG. 4 are installed with their A—A directions of holes 15 aligned in the wheel radial direction and their B—B directions with no holes in the circumferential direction, that is, in the rotational direction, as shown in FIG. 2. On the other hand, for the bushings 5 between the driving arms 9a and the wheel 7, the rubber bushings are respectively orientated 90 degrees relative to the angular positions of the bushings 4, that is, the bushings 5 are installed with their A—A directions tangential to the rotational direction, as shown in FIG. 3.

By the above described construction and arrangement, a relatively high torque is transmitted to the wheel 6, while a relatively low torque is transmitted to the wheel 7. Accordingly, the fitted joint between the driving arms 9a and the hollow shaft 3 may be of simple construction, a simple bolted joint being sufficient in some cases.

In order to indicate more fully the utility of the present invention, the following example of numerical analysis is presented, it being understood that this example is presented as illustrative only, and that it is not intended to limit the scope of the invention.

Figure 5:
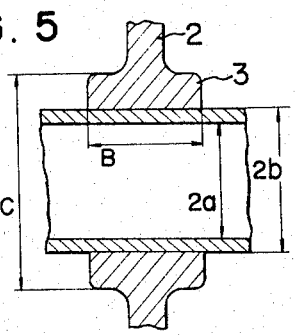
FIG. 5 is a fragmentary sectional view taken in a plane through the axle axis showing the force-fit parts of a gear and a hollow shaft.

Referring to FIG. 5, the parts shown therein will be assumed to have the following dimensions.

2a: inner diameter of hollow shaft 3=210 mm.=8.27 in.
2b: outer diameter of hollow shaft 3=260 mm.=10.24 in.
2c: outer diameter of boss of gear 2=344 mm.=13.56 in.
B: axial length of gear boss=160 mm.=6.30 in.

Then, the surface pressure $P_m$ of the force-fitted parts shown in FIG. 5 can be expressed by the following equation.

$$P_m = \frac{E\delta}{b} \frac{(b^2-a^2)(c^2-b^2)}{2b^2(c^2-a^2)}$$

where:

E is the modulus of elasticity of the material, assumed to be 21,000 kg./mm.$^2$ or $8.21 \times 10^7$ 16/in.$^2$, for example; and $\delta$ is the fit interference, assumed to be 0.3 mm. or .0131 in. for example.

$P_m = 5.75$ kg./mm.$^2$ $1.97 \times 10^4$ 16/in.$^2$

The force-fit force F is given by the following equation.
Then, $$F = 2b\pi B P_m \mu$$

where $\mu$ is the friction coefficient, assumed to be 0.1, for example. From the above equation, F=75 metric tons=82.6 short tons.

In the conventional construction and arrangement whereby equal torques are transmitted through the right and left driving arms 9 and 9a, the force with which the driving arm group 9a is fitted should be approximately one half of the force with which the gear 2 is fitted. It is difficult to provide strength in the fitting parts of the driving arms 9a and the hollow shaft 3 so as to permit this high fitting force because of the space restriction as mentioned hereinbefore.

However, when the rigidity of the rubber bushings 5 in the rotational direction is caused to be one third, for example, of that of the bushings 4 as in the present invention, the fitting force for the driving arm group 9a can be reduced to 75 metric tons or 82.6 short tons×½×⅓=12.5 metric tons, or 13.78 short tons, that is, ⅙ of the force for fitting the gear 2. The shape and dimensions of the fitting parts can be simplified accordingly, and in some cases a bolted joint can be used instead of a force-fit joint. Accordingly, the assembly and disassembly of the driving arms 9a are facilitated, and replacement and checking of the bearings 8 can be carried out in a simple manner.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What I claim is:

1. In a power transmission arrangement, in combination, two driven load-supporting wheels, an axle connected to said wheels, a hollow shaft circumferentially about said axle and coaxial therewith, means to rotationally drive said hollow shaft, means to transmit torques of different magnitudes respectively to said wheels comprising a first driving arm connected to said hollow shaft and to one of said wheels and a second driving arm connected to said hollow shaft and to the other of said wheels, for each arm torque-transmitting bushing means for transmitting torque from the arms with different magnitudes to an associated one of said wheels respectively, said bushing means each having a higher torque transmissibility and a lower torque transmissibility in dependence upon their angular orientation in the direction of rotation of the wheels, the bushing means associated with said arms being oriented with their higher and lower torque transmissibility in mutually-perpendicular diametrical directions, and the angular orientation of said bushing means being such that bushing means associated with said first arm are oriented angularly to exhibit higher torque transmissibility in the direction of wheel rotation at about 90° to the lower torque transmissibility of the bushings associated with said second arm.

2. In a power transmission arrangement according to claim 1, in which said bushing means comprise a plurality of resilient alike bushings.

3. In a power transmission arrangement according to claim 2, in which said bushings are made of a resilient material and comprise holes to vary the rigidity thereof thereby to vary the torque transmissibility in dependence upon said angular orientation thereof.

4. In a power transmission arrangement according to claim 1, in which said bushing means comprise a plurality of load-supporting bushings arranged in alike load-supporting positions such that the bushings associated with both respective wheels have same overall load-supporting elasticity characteristics for each wheel in dependence upon said angular orientation and still have the higher and lower torque transmissibility.

5. In a power transmission arrangement according to claim 1, in which said means to rotationally drive said hollow shaft comprises a motor and gear means for driving the shaft from said motor.

6. In a power transmission arrangement according to claim 1, in which said bushing means associated with one of said wheels comprise bushings each having a plurality of holes in planes corresponding to said diametrical directions.

References Cited

UNITED STATES PATENTS

| 1,488,940 | 4/1924 | Robinson | 152—45 |
| 1,702,081 | 2/1929 | Hatfield | 152—44 |
| 2,182,803 | 12/1939 | Gee | 105—131 XR |
| 2,566,985 | 9/1951 | Gee | 105—131 XR |

FOREIGN PATENTS

| 898,601 | 7/1944 | France. |

ARTHUR L. LA POINT, *Primary Examiner.*

HOWARD BELTRAN, *Assistant Examiner.*

U.S. Cl. X.R.

295—11; 301—6